Apr. 17, 1923.
C. G. OLSON
1,451,921
MECHANISM FOR TESTING GEAR CUTTING MACHINES
Filed June 12, 1922 2 Sheets-Sheet 1
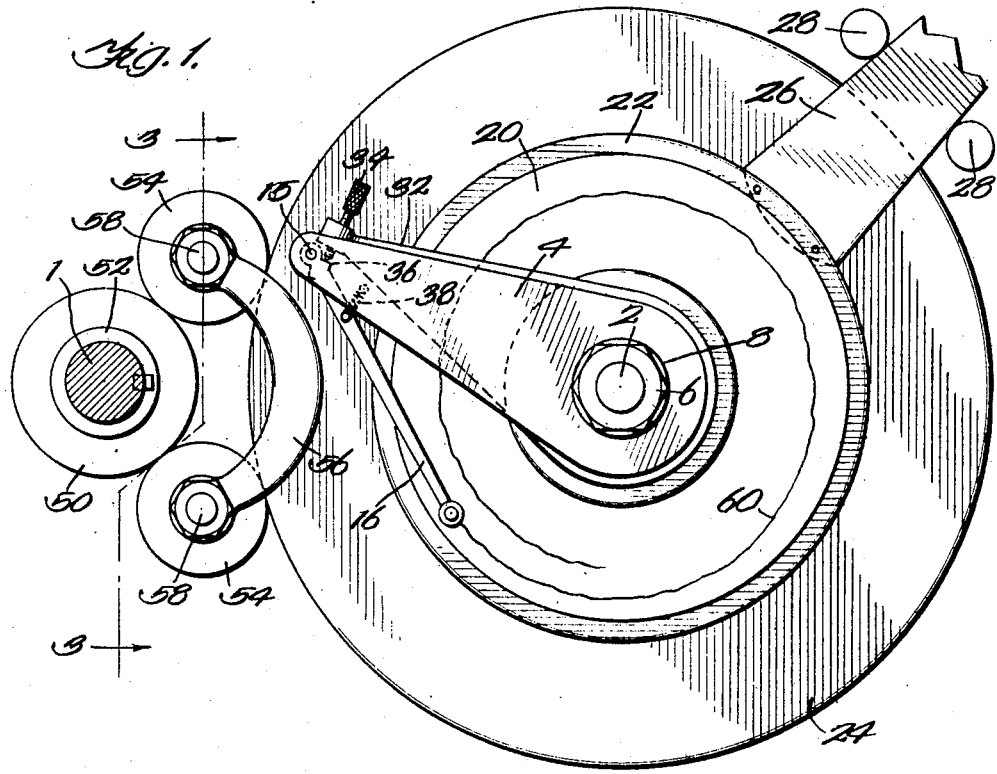
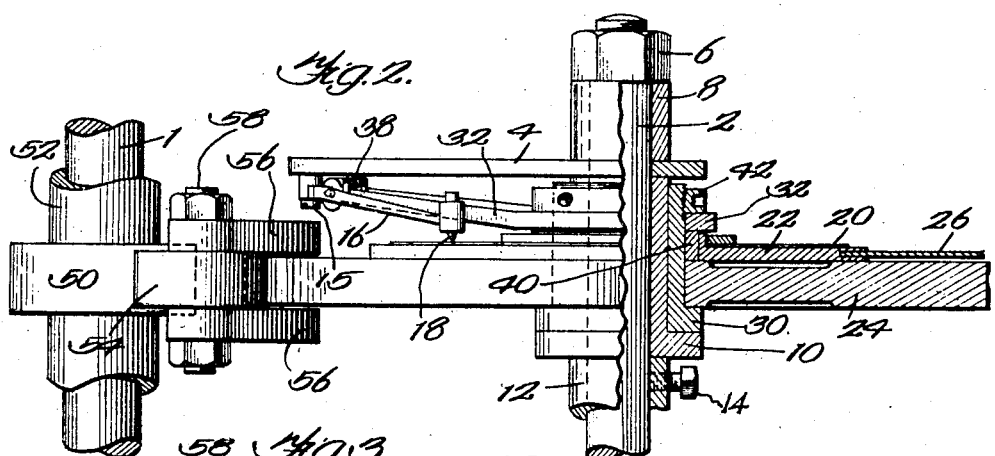
Inventor:
Carl G. Olson
By Cheever & Cox
Attys Apr. 17, 1923.
C. G. OLSON
1,451,921
MECHANISM FOR TESTING GEAR CUTTING MACHINES
Filed June 12, 1922    2 Sheets-Sheet 2
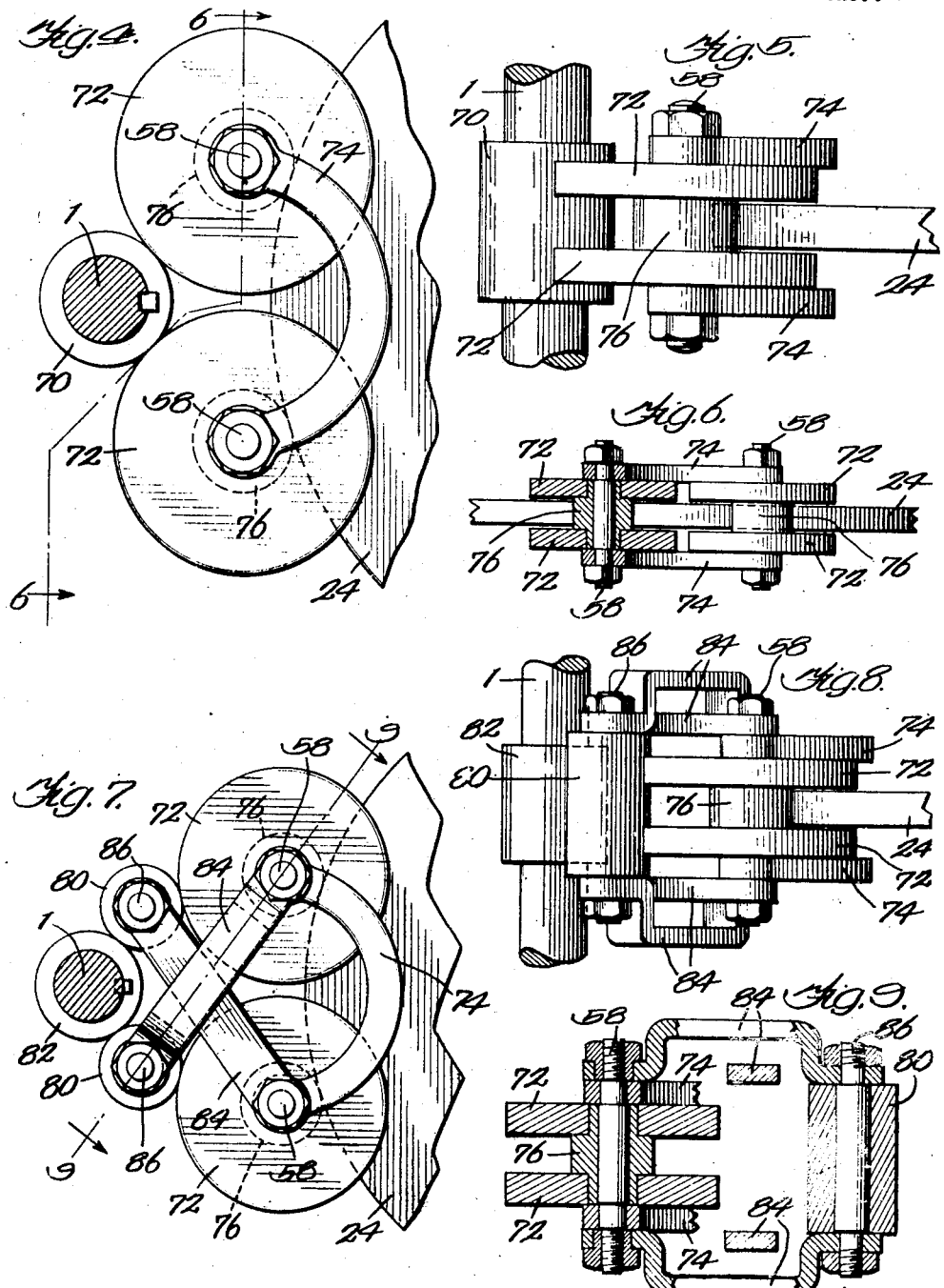
Inventor:
Carl G. Olson
By Cheever + Cox Attys Patented Apr. 17, 1923.

1,451,921

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

MECHANISM FOR TESTING GEAR-CUTTING MACHINES.

Application filed June 12, 1922. Serial No. 567,525.

*To all whom it may concern:*

Be it known that I, CARL G. OLSON, a citizen of the United States, residing at Chicago, in the county of Cook and State of Illinois, have invented a certain new and useful Improvement in Mechanism for Testing Gear-Cutting Machines, of which the following is a specification.

My invention relates to testing mechanisms for machine tools and the like and is especially useful for testing hobbing machines, although it may be used for testing gear wheels or other objects whose speed ratios are supposed to remain uniform throughout the entire revolution. As my mechanism is of special utility in connection with the testing of hobbing machines I will describe it in that connection. A hobbing machine is a machine for cutting gears by the hobbing process, using a helical hob or cutter which rotates in predetermined ratio to the gear to be cut. The arbors or spindles which carry the work and the hob must, therefore, rotate at a certain ratio which must be maintained as uniform as possible throughout the entire revolution of said spindles.

A hobbing machine is composed of a great number of parts, including shafts, bearings, gears, worms, etc., and it is not always that such machines function properly on account of errors which are liabel to creep into such a complicated mechanism. When this occurs, the quality of the work produced becomes inferior and the fault is apt to be ascribed to the hob when it should be ascribed to the machine itself. I have designed an instrument for detecting errors in the hobbing machine, if they exist, and for determining the location of such errors in the mechanism of the hobbing machine. It may be said that the mechanism is designed to indicate the accuracy or inaccuracy of rotation of the parts to be compared at all stages of their revolutions. In a hobbing machine, for example, if the hob arbor and work arbor are geared to run at a ratio of 4 to 1, there may be moments when these speed ratios are not accurately maintained and momentarily one or the other of them may rotate faster or slower than it should. Of course such variations will produce inaccuracies in the work. In a hobbing machine, for instance, some of the teeth in the produced gear may not be accurately formed even though the hob itself be perfect. My machine is designed to enable the operator to obtain a graphic record of any inaccuracies which may exist and to enable him to discover the exact location in the hobbing machine where the imperfections exist so they may be corrected and thereafter produce perfect work so long as the hob is perfect. The general object of my invention, therefore, is to produce a testing instrument or mechanism of the character described. In my device I employ friction discs for transmitting angular movement, and one of the contributory objects of the invention is to provide means for increasing the tractive effect of the discs upon each other. Another object is to provide simple and efficient means for mounting the intermediate discs which transmit the movement from one of the main arbors to the other. Still another object is to provide simple and efficient mechanism for reducing the speed ratio of some of the component elements of my mechanism, thus rendering the application of my mechanism to the hobbing machine more simple and practical.

I accomplish these objects by the mechanism illustrated in the accompanying drawings in which—

Figure 1 is the top plan view of my mechanism applied to a hobbing machine. It will be understood that while in a hobbing machine the hob arbor is usually at right angles or approximately at right angles to the work arbor, one of these arbors is angularly adjustable in the ordinary hobbing machine, and for the purposes of the test, the hobbing machine is so adjusted that the work arbor and hob arbor are parallel. This adjustment will not alter the speed ratios or relative angular velocities of the respective parts; hence it will be observed that in Figure 1 the work arbor and hob arbor are parallel and their axes are perpendicular to the plane of the paper.

Figure 2 is a side elevation partly in section of the parts shown in Figure 1.

Figure 3 is a sectional elevation on the line 3—3 Figure 1.

Figure 4 is a top plan view of a modified arrangement of transmitting discs.

Figure 5 is a side elevation of the parts shown in Figure 4.

Figure 6 is a sectional elevation on the line 6—6 Fig. 4.

Figure 7 is a top plan view of still another modification of the arrangement of transmitting discs.

Figure 8 is a side elevation of the parts shown in Figure 7.

Figure 9 is a sectional view on the line 9—9 Fig. 7.

Like numerals denote like parts throughout the several views.

Let it be assumed that the element 1 represents the hob arbor or spindle of a hobbing machine which has, for the purpose of the test, been brought parallel to the work arbor 2. Let it also be assumed that the proper speed ratio of the hob arbor to the work arbor is 4 to 1—that is, the hob arbor is presumed to rotate four times as fast as the work arbor. This ratio is employed, for example, where so-called "spline shafts" are to be produced. The remainder of the apparatus, outside of the parts 1 and 2, forms the testing instrument which embodies my invention. Briefly, my apparatus has two co-axial rotating parts, one driven by the hob arbor and the other by the work arbor, with suitable reduction gearing (friction discs) between the hob arbor and the element rotated thereby with the result that the two parts ought to rotate in unison at all times, that is, they ought at all times to maintain the same angular velocity. One of the rotating parts, however, supports a stylus arm, the position of which is controlled by the second rotating part with the result that if there is any differential movement between them, the stylus arm will change its position and produce an irregularity in the line traced by the stylus upon a stationary record sheet.

To describe the parts in detail, an arm 4, which forms one of the rotating parts, is rigidly fastened to the work arbor so as to rotate with it. In the present case it is fastened by means of a nut 6 which screws on to the upper end of the work arbor and clamps a collar 8 down upon the top of the arm. Said arm is supported upon a bushing 10 which surrounds the work arbor and by reason of the downward pressure of the stylus arm becomes clamped onto a collar 12 which is secured to the work arbor by a set screw 14. The essential characteristic is that arm 4 which supports the stylus arm rotates in strict unison with the work arbor.

Pivotally attached to the arm 4 by a pin 15 is a stylus arm 16 which carries a stylus 18 at its outer end. The latter serves to trace a line or graph upon a record sheet 20, which is supported upon a non-rotatable disc 22. Said disc is supported upon a disc 24, presently to be described, and is prevented from rotating by a holding arm 26, which is fastened to disc 22 and lies between two stationary pins 28 shown at the top of Figure 1.

The disc 24 constitutes the second rotating part above mentioned. It is co-axial with the work arbor but rotatable independently thereof. It is supported upon a flanged bushing 30 which encircles and rests upon the bushing 10. The arm 32 is clamped to the disc 24 so as to rotate exactly in unison therewith and this arm may be identified as the "stylus controlling arm." At is outer end it carries an adjusting screw 34, the point whereof abuts a shoulder 36 formed near the axis of the stylus arm as best shown in Figure 1. A tension spring 38 keeps the shoulder 36 in close contact with the point of the adjusting pin 34. It will be evident that if the arms 4 and 32 have any differential movement, that is, if they fail to rotate exactly in unison, they will cause the stylus arm to rotate about its axis 15. The means of clamping the stylus-controlling arm 32 to the disc 24 are immaterial, but in the present case a collar 40 is interposed between them and a ring nut 42, which screws on to the upper end of bushing 30, will, when screwed down, hold the parts 24, 30, 32 and 40 rigidly together.

Now to describe the transmitting mechanism which transmits rotation from hob arbor 1 to the disc 24: Referring to the type shown in Figs. 1, 2 and 3, a disc 50 having a hub or collar 52 is keyed or otherwise rigidly secured to the hob arbor. Two friction discs 54 are located in such a manner as to frictionally engage the two discs 50, 24. A pair of bowed springs 56 are provided, one above and the other below disc 24. At the ends of the springs are pins 58 which form axles for discs 54. The arrangement of the parts is such that the springs exert a continuous pressure of the discs 54 into the throat formed between the discs 50, 24. Differently expressed, under normal conditions of assembly the springs 56 are partially straightened with the result that they tend constantly to become more bowed and thus "wedge" the rollers 54 into the space between the discs 50 and 24 so to speak. This produces a high degree of traction between the discs with the result that slipping is avoided and the rotation of the driving disc 50 will be accurately transmitted to driven disc 24. In order to obtain a graph that can be relied on, it is evident that the movement of the hob arbor must be faithfully reflected in the movement of disc 24 and arm 32, and this mechanism with its bowed springs insures this important result. This arrangement has another advantage in that the springs 56, lying as they do on both sides of the disc 24 support themselves on the disc 24 and thus support the transmission discs 54. Consequently no separate supporting mechanism is required and the construction becomes very simple.

The function of the intermediate discs 54 is merely to transmit motion from disc 50 to disc 24. They may be regarded as idlers and do not change the speed ratio. The proper speed ratio or angular velocity of the stylus controlling arm 32 is obtained by properly selecting the diameters of the discs 50 and 24. In the present case, as it is assumed that the hob arbor rotates four times as fast as the work arbor, it will, of course, be necessary to secure to the hob arbor a disc which is one-fourth the diameter of the disc 24.

The operation will now be readily understood. When the hobbing machine is started with the parts assembled as shown in Figures 1 and 2, if the two arbors rotate at all times in precise harmony with each other, the arms 4 and 32 will rotate in precise synchronism and pin 34 will hold the stylus arm 16 constantly in the same angular position with respect to arm 4. In such case the stylus will trace a circular graph upon the record sheet 20 and the observer is assured that the gearing of the hobbing machine is perfectly constructed and in perfect order. If, however, either of the arbors momentarily lags or gains upon the other, there will immediately be a difference in the angular velocity of the two arms 4 and 32, and the relative movement between them will cause the stylus arm 16 to move in one direction or another about its pivot 15. This will produce an irregularity or wave in the graph line 60 on the record sheet with the result that the observer will immediately be apprised of the error in the hobbing machine mechanism and by observing what parts of the machine are in co-operative relation at the time he will be able to locate what parts of the machinery need correction.

In the foregoing I have illustrated a mechanism suitable for test purposes where the ratio between the two arbors is four to one. Commonly, however, the ratio is greater than this and in Figures 4, 5 and 6 I have shown a construction which may be employed in the case of these greater speed ratios. Referring to these figures, the disc 24 is of the same size as before but a disc 70 smaller than disc 50 is selected to be fastened to the hob arbor and a reduction gearing is interposed between the two discs. In the form illustrated, the disc 70 abuts two discs 72 which are rotatable about axles 58 as before. These axles are carried at the ends of a pair of bowed springs 74, which are similar to the bowed springs 56 previously described. In this case, however, the discs 72 instead of directly engaging the disc 24 have fastened to them a disc 76 of smaller diameter, which engages disc 24. This evidently will permit the disc 24 to rotate at the same speed as before even though the hob arbor rotates at a much higher speed. In other respects the operation is the same as before. In this case the discs 72 are arranged in pairs, one disc of a pair being above and the other below the disc 24, and the result is that the transmission discs are self-supporting upon disc 24 and no extraneous supporting mechanism is required. In this case, also, the transmitting mechanism is self-supporting upon the disc 24. In view of the fact that two discs 70 are employed instead of one, the disc 70 is made longer (axially) than is required in the case of the disc 50. It will be noted, particularly by reference to Figure 4, that in this case also the bowed springs 74 tend to wedge the transmitting discs into the throat between the disc 70 and the disc 74, and thus increase the tractive effect so that slippage will be prevented and disc 24 will rotate in exact harmony with the hob arbor.

In the type shown in Figures 4, 5 and 6, it will be observed that the intermediate or transmission discs reverse the direction of rotation so that disc 24 instead of rotating in the same direction as the hob arbor, rotates in the opposite direction. This is suitable in some cases; for example, if a hob is employed having a left-hand thread. In case, however, that it is desirable to have the disc 24 rotate in the same direction as in the one described in connection with Figures 1, 2 and 3, a different rigging may be employed as illustrated in Figures 7, 8 and 9. In this latter form the transmission discs are odd in number instead of even. The construction is otherwise similar to the one shown in Figures 4, 5 and 6, but extra discs 80 are added, these discs engaging the peripheries of the discs 72. They are driven by a disc 82 secured to the hob arbor. Said discs 80 are supported by yokes 84 which at one end receive the axles 58 and at the other end carry axles 86, which support the discs 80. In this, as in the previous designs, the bowed springs 74 tend to crowd the transmission discs into the throat between the disc 24 and the disc fastened to the work arbor.

It is evident that although I have described my mechanism as applied to a hobbing machine it may be applied in any case where it is desired to compare the accuracy of rotation of two rotatable elements. In the foregoing description I have used the term "arbor" for the parts 1 and 2, but these or equivalent parts are frequently termed "spindles" or "shafts". The parts 4 and 32 are here shown in the form of arms radiating from the work arbor but their form may be varied and they may be regarded generally as testing members, for it is their joint action upon the stylus arm 16 which makes it possible to interpret the test. While I have referred to the arm 16 as the "stylus" arm it may be generally referred to as an indicator arm or "indicator" for it is the position of this arm which indicates whether the angular movements are correct or not.

Having thus described my invention, what I claim as new and desire to secure by Letters Patent is:

1. Mechanism for testing the angular velocities of two rotating elements comprising a driving disc rigidly connected to one of the elements to be tested, a driven disc, separated from the driving disc, an intermediate disc for transmitting motion from the driving to the driven disc, means for urging the intermediate disc into the throat between the driving and driven discs, and indicating mechanism under the joint control of the driven disc and the other element to be tested.

2. Mechanism for testing the angular velocities of two rotating elements comprising a driving disc rigidly connected to one of the elements to be tested, a driven disc, separated from the driving disc, a pair of intermediate discs for transmitting motion from the driving to the driven disc, said intermediate discs being at opposite ends of the throat formed between the driving and driven discs, means for constantly urging the intermediate discs towards each other to increase the traction, and indicating mechanism under the joint control of the driven disc and the other element to be tested.

3. Mechanism for testing the angular velocities of two rotating elements comprising a driving disc rigidly connected to one of the elements to be tested, a driven disc, separated from the driving disc, a pair of intermediate discs for transmitting motion from the driving to the driven disc, said intermediate discs being at opposite ends of the throat formed between the driving and driven discs, and a pair of bowed springs for constantly urging the intermediate discs towards each other, said bowed springs lying on opposite sides of one of the other discs, to be supported thereby, and indicating mechanism under the joint control of the driven disc and of the other element to be tested.

4. Mechanism for testing the angular velocities of two rotating elements comprising a driving disc, rigidly connected to one of the elements to be tested, a driven disc, a pair of intermediate discs for transmitting rotation from the driving to the driven disc, a pair of bowed springs for urging the intermediate discs into the throat located between the driving and driven discs, said springs being adapted to support the intermediate discs and adapted to be supported by one of the other discs, and indicating mechanism under the joint control of the driven disc and the second element to be tested, said driven disc being co-axial with said second element to be tested.

5. Means for comparing the angular velocities of the work arbor and tool arbor of a machine tool, comprising two rotatable, co-axial, test members and an indicator subject to the joint control of said test members, one of the test members rotating in timed relation with one of the arbors, and a transmission gearing for rotating the other test member in timed relation with the other arbor, said gearing including a driving and a driven disc separated from each other, an intermediate disc for transmitting motion from the driving disc to the driven disc, and spring mechanism for urging the intermediate disc into the throat between the other two discs.

6. Means for comparing the angular velocities of the work arbor and tool arbor of a machine tool, comprising two rotatable, co-axial, test members and an indicator subject to the joint control of said test members, one of the test members rotating in timed relation with one of the arbors, and a transmission gearing for rotating the other test member in timed relation with the other arbor, said gearing including a driving and a driven disc separated from each other, an intermediate disc for transmitting motion from the driving disc to the driven disc, and means supported by the rim portion of said driven disc for supporting the intermediate disc.

In witness whereof, I have hereunto subscribed my name.

CARL G. OLSON.